(12) United States Patent
Ferri et al.

(10) Patent No.: US 9,043,720 B2
(45) Date of Patent: May 26, 2015

(54) POST SELECTION MOUSE POINTER LOCATION

(75) Inventors: Richard C. Ferri, Ulster Park, NY (US); Joshua H. Horton, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 744 days.

(21) Appl. No.: 13/270,833

(22) Filed: Oct. 11, 2011

(65) Prior Publication Data

US 2013/0091457 A1  Apr. 11, 2013

(51) Int. Cl.
*G06F 3/0481* (2013.01)

(52) U.S. Cl.
CPC .. *G06F 3/04812* (2013.01); *G06F 2203/04801* (2013.01)

(58) Field of Classification Search
CPC ...................................................... G06F 3/0481
USPC ........................................................ 715/781
See application file for complete search history.

(56) References Cited

U.S. PATENT DOCUMENTS

| 5,371,847 | A * | 12/1994 | Hargrove | 715/788 |
|---|---|---|---|---|
| 5,596,347 | A * | 1/1997 | Robertson et al. | 715/856 |
| 8,555,193 | B2 * | 10/2013 | Sar et al. | 715/781 |
| 2002/0054141 | A1 * | 5/2002 | Yen et al. | 345/804 |
| 2003/0112280 | A1 * | 6/2003 | Driskell | 345/835 |
| 2004/0165013 | A1 * | 8/2004 | Nelson et al. | 345/858 |
| 2006/0085760 | A1 * | 4/2006 | Anderson et al. | 715/778 |
| 2007/0128899 | A1 * | 6/2007 | Mayer | 439/152 |
| 2007/0253025 | A1 * | 11/2007 | Terayoko | 358/1.16 |
| 2008/0229254 | A1 * | 9/2008 | Warner | 715/856 |
| 2010/0011313 | A1 * | 1/2010 | Sauve et al. | 715/777 |
| 2010/0011316 | A1 * | 1/2010 | Sar et al. | 715/784 |

OTHER PUBLICATIONS

Microsoft, Working screeshot of Windows 2008 server manufactured by Microsoft, released on Feb. 27, 2008, 6 pages.*
Abstract of JP2003330594; "Device, Computer Program and Method for Automatically Moving Cursor" Publication Date: Nov. 21, 2011; Applicant: Alps Electronic Co. LTD; p. 1 of 1.
Abstract of JP2000259317; "Hybrid Display Device", Publication Date: Sep. 22, 2000; Applicant: Kokusai Electric Co. LTD.; p. 1 of 1.
Abstract of JP10333832A; "Cursor Mark Controller and Method Therefor"; Publication Date: Dec. 18, 1998; Applicant: Nippon Denki Office Syst; pp. 1-3.

* cited by examiner

*Primary Examiner* — Reza Nabi
(74) *Attorney, Agent, or Firm* — Cantor Colburn LLP; William A. Kinnaman, Jr.

(57) ABSTRACT

A technique is provided for post selection location of a mouse pointer icon in a display screen of a computing device. A software tool receives input of the post selection location for the mouse pointer icon. The post selection location defines a default location to move the mouse pointer icon in response to a window action taken on a window displayed in the display screen. In response to the window action in which the mouse pointer icon is initially displayed at a selection location corresponding to the window action, the mouse pointer icon is moved to the post selection location such that the mouse pointer icon is displayed at the post selection location in the display screen.

18 Claims, 10 Drawing Sheets

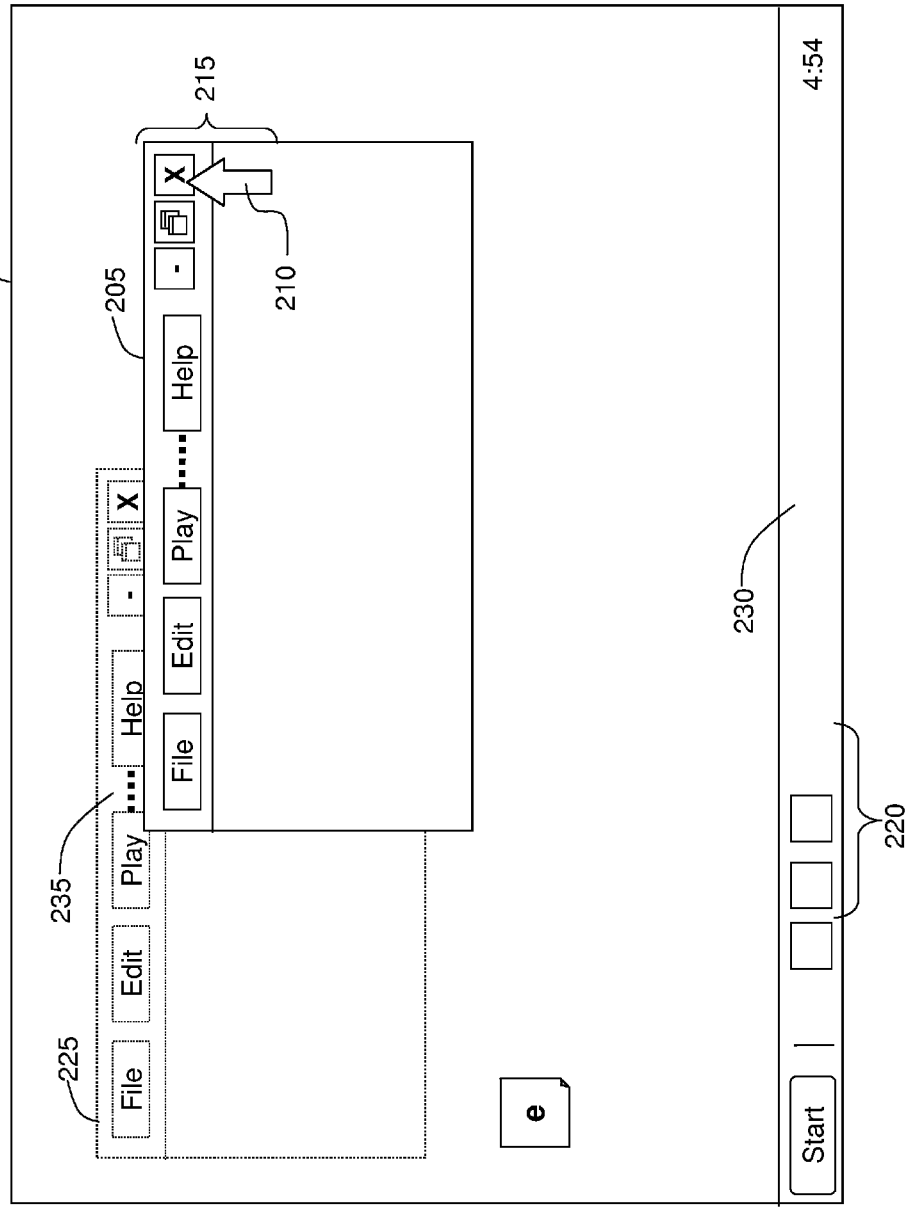

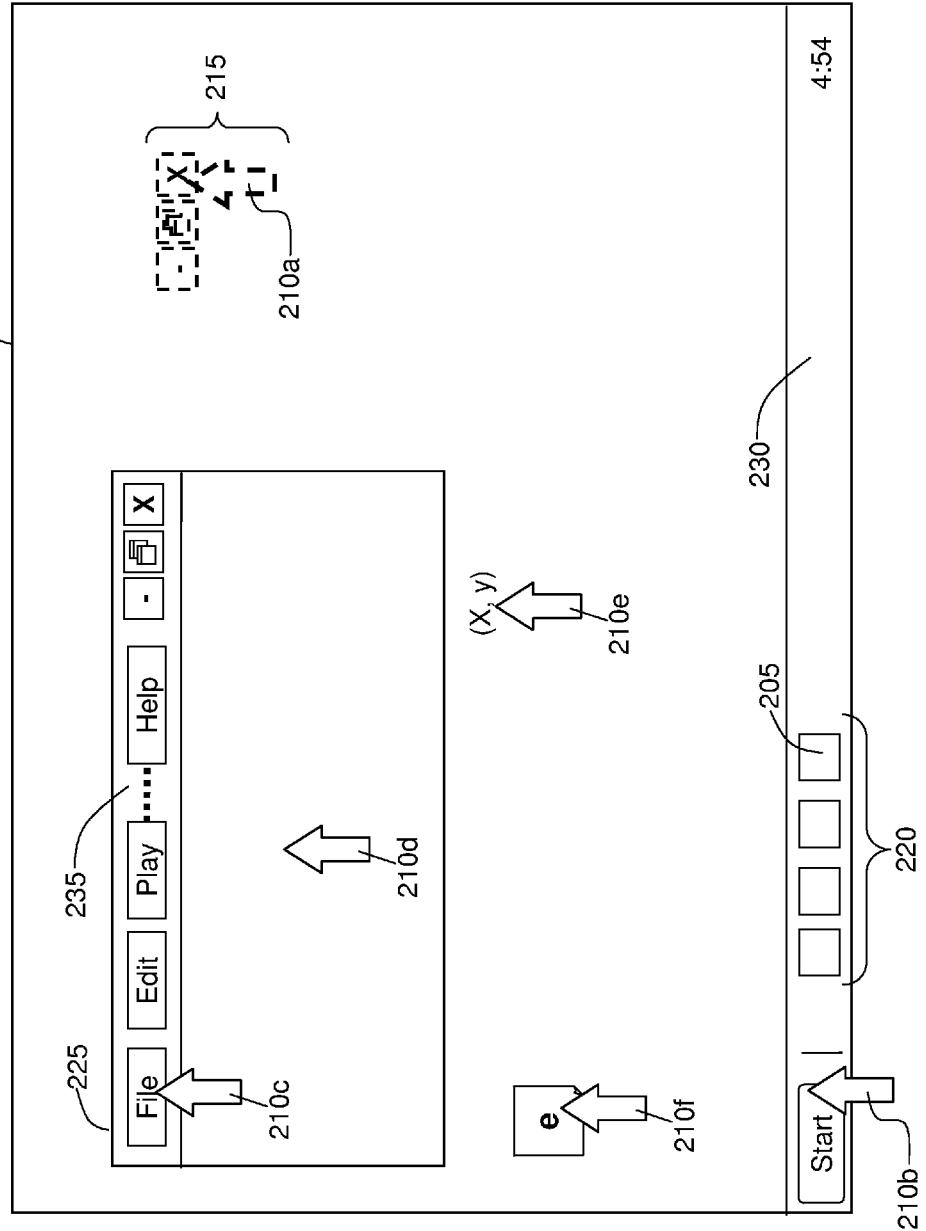

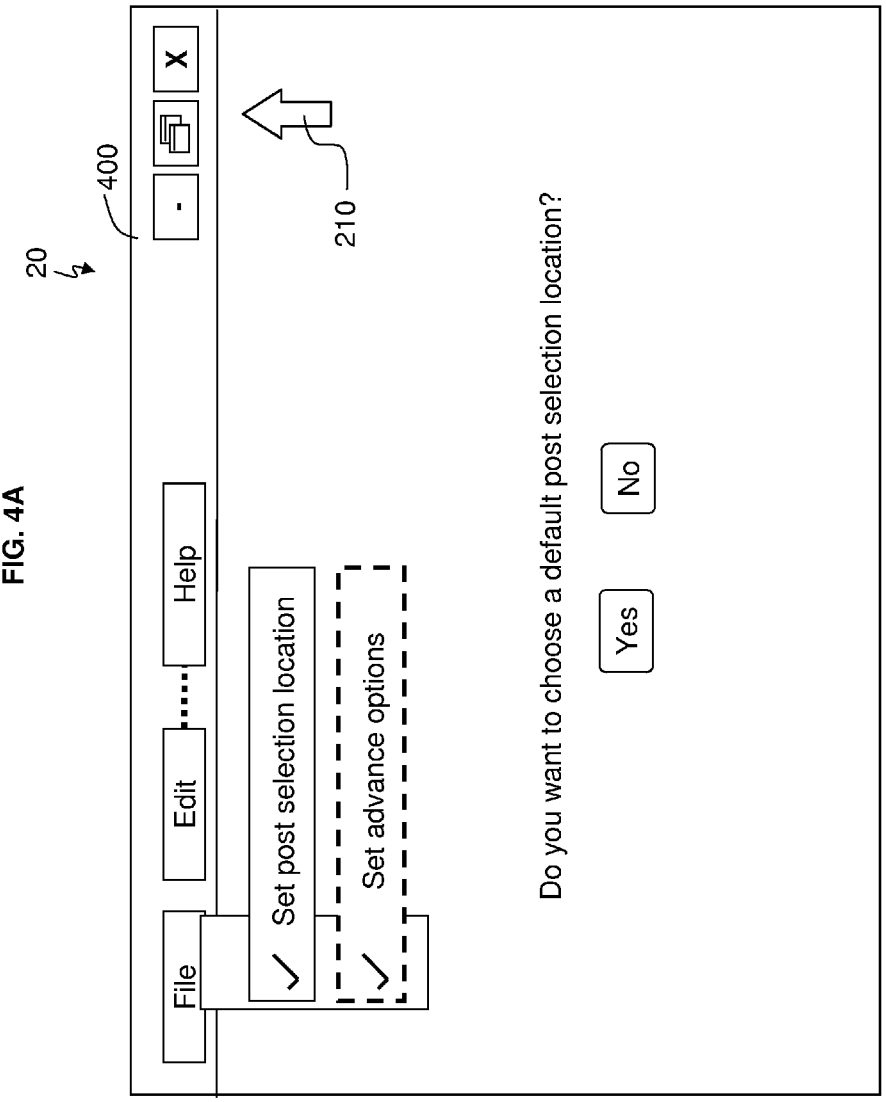

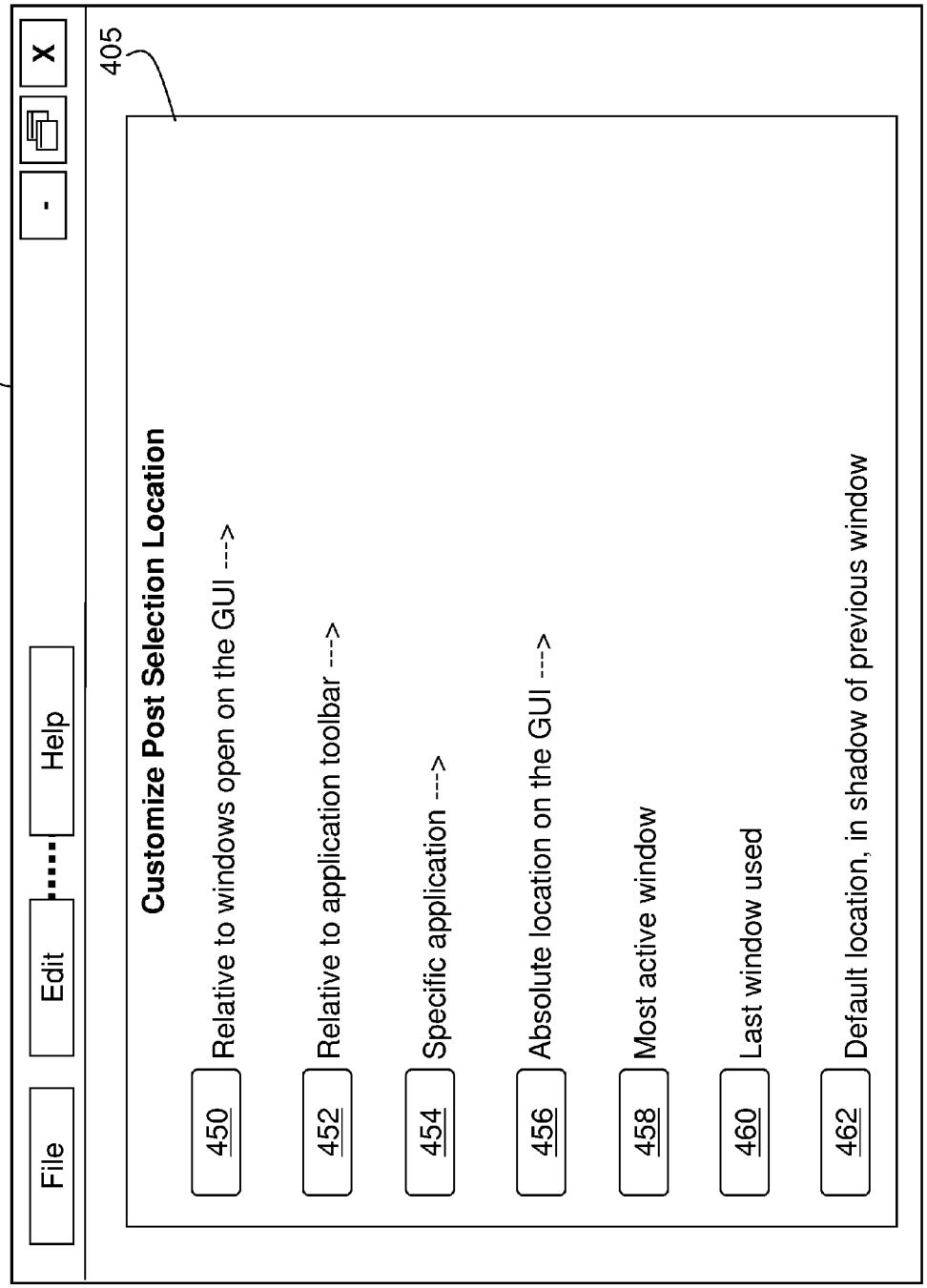

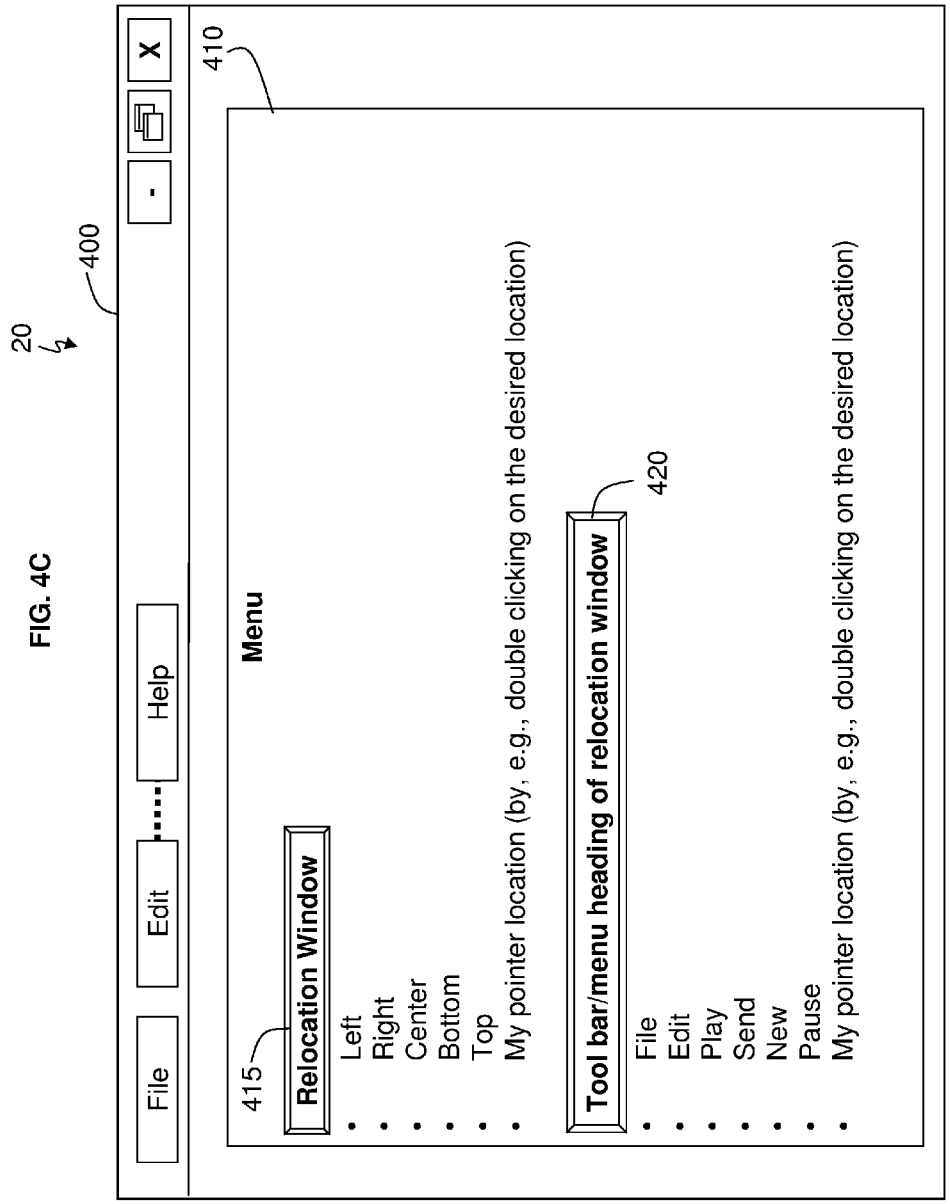

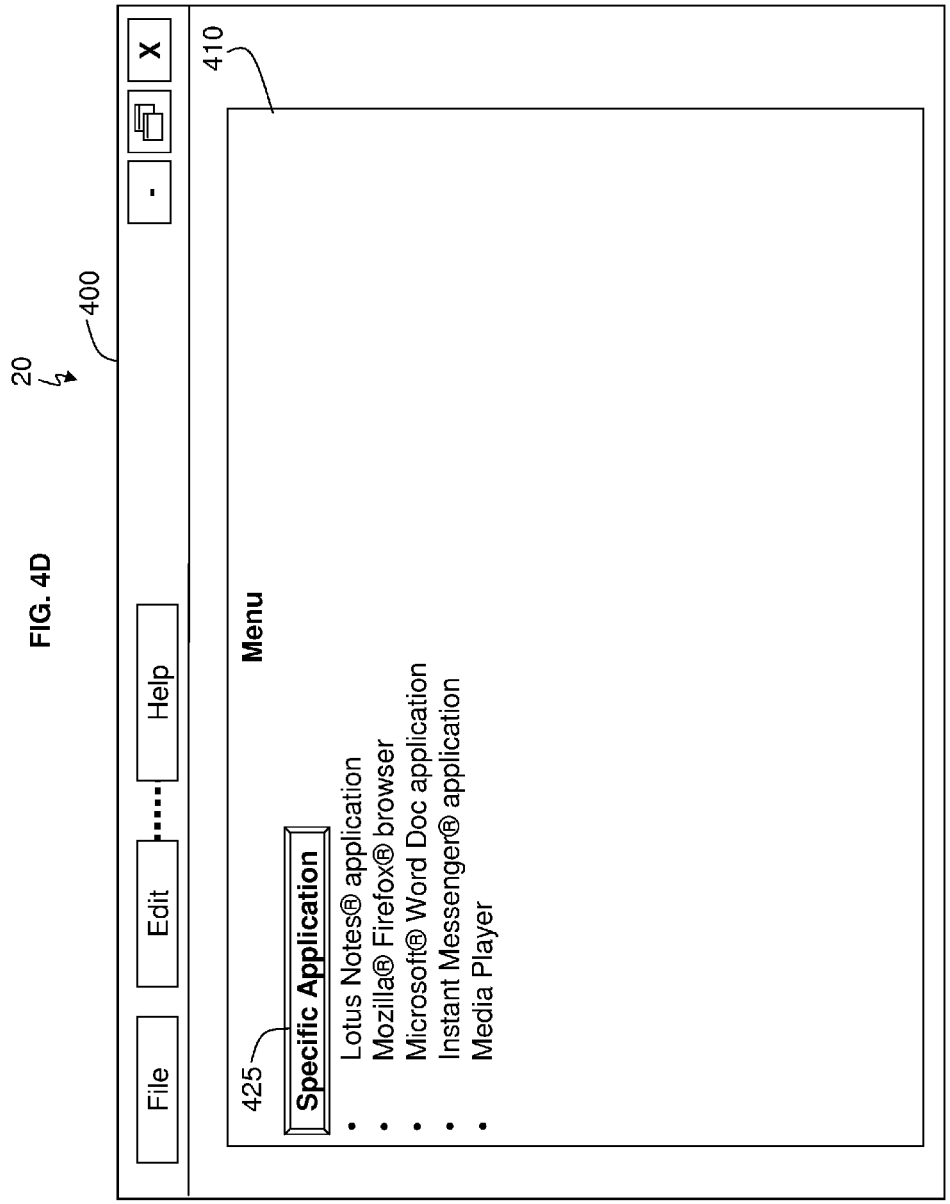

Receive by a software tool input of the post selection location for the mouse pointer icon, in which the post selection location defines a default location to move the mouse pointer icon in response to a window action taken on a window displayed in the display screen  505

Responsive to the window action in which the mouse pointer icon is initially displayed at a selection location corresponding to the window action, movie the mouse pointer icon to the post selection location such that the mouse pointer icon is displayed at the post selection location  510

POST SELECTION MOUSE POINTER LOCATION

BACKGROUND

Exemplary embodiments relate to graphical user interfaces (GUI), and more specifically, to defining a mouse pointer/cursor location upon a window action.

In computing, a cursor is an indicator used to show the position on a display screen (e.g., computer monitor, television screen, mobile device screen, and/or other display device) that will respond to input from a text input (e.g., by a keyboard, keypad, touch screen) or pointing device (including a mouse, stylus, touch on a touch screen, etc.). The cursor may be a mouse pointer icon that appears, e.g., as an arrow, a pointing finger, and/or any other location icon that graphically illustrates a position on a display screen as understood by one skilled in the art. The term mouse pointer icon may be utilized herein to represent a cursor icon on a display screen indicating a position that responds to user input.

After making a selection in any GUI using a mouse pointer icon, the mouse pointer icon remains in the shadow of the selection, which may not be the desired location where the user would prefer the mouse pointer icon to be in the display screen. This requires the user to then manually move the mouse pointer icon to the desired location. This shadow post selection pointer location has persisted in the graphical user interface industry.

BRIEF SUMMARY

According to an exemplary embodiment, a method for post selection location of a mouse pointer icon in a display screen of a computing device is provided. The method includes receiving by a software tool input of the post selection location for the mouse pointer icon, where the post selection location defines a default location to move the mouse pointer icon in response to a window action taken on a window displayed in the display screen. Also, the method includes in response to the window action in which the mouse pointer icon is initially displayed at a selection location corresponding to the window action, moving the mouse pointer icon to the post selection location such that the mouse pointer icon is displayed at the post selection location in the display screen.

According to an exemplary embodiment, a computing device is configured to define a post selection location of a mouse pointer icon in a display screen. The computing device includes a processor and a software tool configured to operate on the processor. The software tool is configured to receive input of the post selection location for the mouse pointer icon, where the post selection location defines a default location to move the mouse pointer icon in response to a window action taken on a window displayed in the display screen. The software tool is configured to, in response to the window action in which the mouse pointer icon is initially displayed at a selection location corresponding to the window action, move the mouse pointer icon to the post selection location such that the mouse pointer icon is displayed at the post selection location in the display screen.

According to an exemplary embodiment, a computer program product is provided for defining a post selection location of a mouse pointer icon in a display screen of a computing device. The computer program product includes a computer readable storage medium having computer readable program code embodied therewith. The computer readable program code is configured for receiving the post selection location for the mouse pointer icon, where the post selection location defines a default location to move the mouse pointer icon in response to a window action taken on a window displayed in the display screen. The computer readable program code is configured for, in response to the window action in which the mouse pointer icon is initially displayed at a selection location corresponding to the window action, moving the mouse pointer icon to the post selection location such that the mouse pointer icon is displayed at the post selection location in the display screen.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features of the present disclosure are apparent from the following detailed description taken in conjunction with the accompanying drawings in which:

FIG. 2 illustrates a graphical user environment displayed on a display screen, in which a window action is performed by a user making a selection via a mouse pointer icon according to an exemplary embodiment.

FIG. 3 illustrates various post selection location options that can be defined via a software tool such that the software tool relocates a mouse pointer icon to a desired post selection location displayed on the display screen according to an exemplary embodiment.

FIG. 4A illustrates a screen in which the user can set the post selection location to relocate the mouse pointer icon after a window action according to an exemplary embodiment.

FIG. 4B illustrates a screen having a menu of selection items/buttons to customize the post selection location according to an exemplary embodiment.

FIG. 4C illustrates a screen having a menu of advance options according to an exemplary embodiment.

FIG. 4D illustrates a screen continuing the menu of advance options according to an exemplary embodiment.

FIG. 5 is a method for post selection location of a mouse pointer icon according to an exemplary embodiment.

DETAILED DESCRIPTION

Exemplary embodiments are configured to provide the underlying capability (program logic and algorithms in software and/or hardware components) for any graphical user interface (GUI) to allow customization of the post selection location of a mouse pointer icon.

In any graphical user interface that supports a mouse pointer graphical icon, the default placement of the mouse pointer icon after a user makes a selection lags behind current progression. For example, when a user selects a window action, the mouse pointer icon remains in the shadow of the selection after the selection is made. Window actions are actions taken that affect the display size, display view, and/or existence of a window in a graphical user interface. Window actions may include but are not limited to a close window action, a minimize window action, and a maximize window action. The shadow means the same location on the display screen at which the user, e.g., clicked/executed, to make the selection to execute the window action. In nearly all or most use cases, this shadow location is not where the user would prefer the mouse pointer icon to be, thus requiring the user to manually move the mouse pointer icon, either back to the previous drop-down menu location, or to another screen or interface location. As discussed herein, this technique discloses smart mouse pointer icon positioning after a selection function (i.e., window action) that makes mouse pointer icon positioning smarter and more efficient; this technique is applicable to virtually any GUI. The user could set or use the post selection location (default behavior), where the mouse pointer icon is moved to a more beneficial position after the selection is made, instead of leaving the cursor (mouse pointer icon) in the shadow of the previous (instant) selection. At a more granular level, the default mouse pointer icon post selection location can be customizable such that the user could select a default such as, e.g., a previous menu bar, the next logical selection point, the operating system applications tool bar, etc. Additionally, the user can explicitly define any desired position on the display screen as the default post selection location for mouse pointer icon. This prevents the user from having to continually move the mouse pointer icon manually after making graphical user interface selections, saving both time and manual mouse movements.

Figure 1:
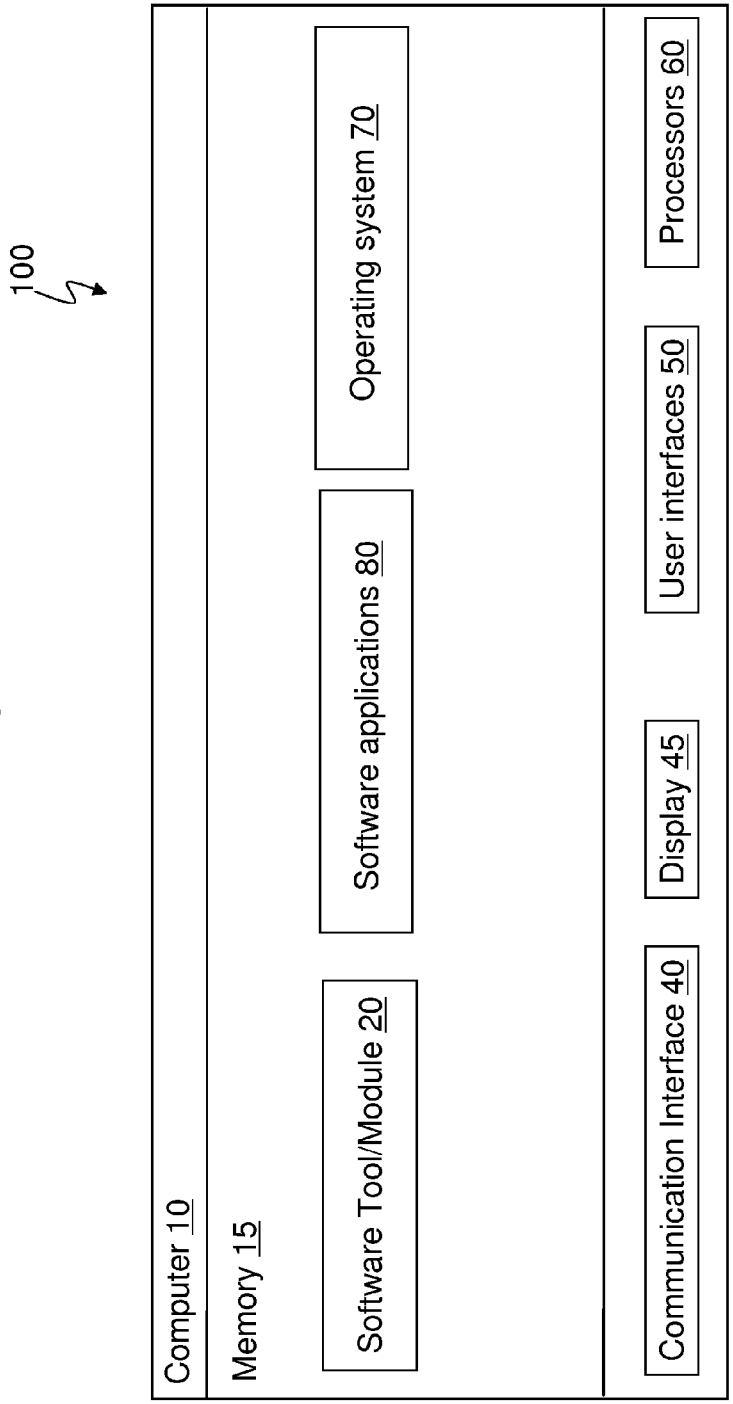
FIG. 1 illustrates a block diagram of a computer having various software and hardware elements for defining a post selection location of a mouse pointer icon and relocating the mouse pointer icon in a display screen according to an exemplary embodiment.

Now turning to the figures, FIG. 1 illustrates a block diagram 100 of a computer having various software and hardware elements for defining a post selection location of a mouse pointer icon and relocating the mouse pointer icon to the post selection location in a display screen in accordance with an exemplary embodiment. The diagram 100 depicts a computing device 10 which may be one or more servers, mobile devices (such as a smart phone, tablet, laptop computer, etc.), or any type of computer processing device. The computing device 10 may include and/or be coupled to memory 15, a communication interface 40, a display screen 45, user interfaces 50, processors 60, operating system 70, software applications 80, and software tools 20. The communication interface 40 comprises hardware and software for communicating over a network including a wired and/or wireless network. The user interfaces 50 may include, e.g., a track ball, mouse, pointing device, keyboard, keypad, touch screen, etc., for interacting with the computing device 10, such as inputting information, making selections, etc. The computing device 10 includes memory 15 which may be a computer readable storage medium. One or more applications such as the software tool 20 (module) may reside on or be coupled to the memory 15, and the software tool 20 comprises logic and software components to operate and function in accordance with exemplary embodiments in the form of computer executable instructions. The software tool 20 may include a graphical user interface (GUI) which the user can view and interact with to define default behavior for the mouse point icon including post selection location after a window action. Although the software tool 20 is shown as a single element in FIG. 1 for conciseness, the software tool 20 may represent numerous software components (or modules) according to exemplary embodiments.

The operating system 70 is configured to display one or more windows on the display screen 45. For example, the particular windows on the display screen 45 may be run (instantiated) by the software applications 80, the operating system 70, a downloaded program, etc. The window may be a program window (e.g., such as for a word processing application, an email application, a media player application, etc.), an Internet browser window, or any type of graphical user display opened on the display screen 45. For example, a window is a visual area containing some kind of user interface. It may have rectangular shape that can overlap with the area of other windows. The window displays the output of and may allow input to one or more processes/applications running via the window. As understood by one skilled in the art, windows are primarily associated with graphical displays, where they can be manipulated with a mouse cursor (i.e., mouse pointer icon).

A mouse pointer icon may be displayed in the display screen 45 as part of the normal operation of the operating system 70. The user may utilize the user interface 50 to move the mouse pointer icon to a desired location, e.g., to interact with a window displayed on the display screen 45. The window can be any process running on the processors 60 of the computing device 10 including a process over the Internet. The user may want to perform a window action (e.g., by making a selection with the mouse pointer icon) on the window, which will be recognized by the software tool 20. The software tool 20 is configured (with software logic) to recognize the window action as a trigger for relocating the mouse pointer icon to the post selection location. A window action can be any selection and/or input that affects the display/viewing of the window (as a whole) on the desktop (graphical user) environment (provided by the operating system 70) of the display screen 45. As understood by one skilled in the art, a desktop environment refers to a graphical user interface (GUI) derived from the desktop metaphor that is seen on most modern computers, and the desktop environment typically consists of icons, windows, tool bars, folders, wallpapers, and desktop widgets.

In a normal case of a window action, when the user (and/or an automated process) performs a window action to close, minimize, and/or maximize a window using the mouse pointer icon, the mouse pointer icon remains in the selection location (i.e., the shadow location) at which the mouse pointer icon was initiated/selected (e.g., clicked) to perform the window action. However, according to an exemplary embodiment, the software tool 20 is configured (in advance) to move or jump the mouse pointer icon displayed on the display screen 45 to a new/different location (i.e., a post selection location) preselected by the user of the software tool 20. The software tool 20 is configured to automatically move the mouse pointer icon from the shadow location (at which the window action occurred) to be displayed on the display screen 45 at the desired post selection location.

FIG. 2 illustrates a graphical user (e.g., desktop) environment 200 displayed on the display screen 45, in which a window action is performed by the user making a selection (via the user interface 50) using the mouse pointer icon 210 according to an exemplary embodiment. A simplified version of the graphical user environment 200 is shown so as to not obscure the figure.

In one example case, the user has moved the mouse pointer icon 210 onto the close button of an open window 205. Upon the user performing the window action to select/initiate the close button, the mouse pointer icon 210 would normally remain in the selection location 215 at which the window action occurred as a shadow of where the selection was made, even though the window 205 has been closed in this example case. This selection location at which the window action was executed is shown as 215.

FIG. 3 illustrates various post selection location options that can be defined in the software tool 20 such that the software tool 20 relocates the mouse pointer icon 210 to a desired post selection location displayed on the display screen 45 according to an exemplary embodiment. A few example post selection locations for the mouse pointer icon 210 are identified by using mouse pointer icons 210a-f, where each of the displayed post selection locations for the mouse pointer icons 210a-f can be predefined and/or identified by the user in advance via the software tool 20. Each of the mouse pointer icons 210a-f represents and is displayed at a different position for the post selection location.

As mentioned above, the user can choose to allow (via the software tool 20) the mouse pointer icon 210a to remain at the section location 215 as an option. The minimize, maximize, and close buttons of the previous window 205 are shown with a dashed line to illustrate that the selection location 215 is a shadow of where the window action occurred. The window action could have been a minimize selection, in which case the window 205 is shown in a tool bar 230 among the minimized windows (applications) 220. Similarly, the window action could have been a resize selection. It is noted that the resize and minimize examples are not parallel, because the resize window action attaches the mouse pointer icon to the window frame itself, and the resize window action is a predefined window action provided by the operating system. As such, the mouse pointer icon remains at the location in which the resize window action ends. A minimize window action is not predefined in that the mouse pointer icon does not attach to the window frame of the window, and the mouse pointer icon remains at the selection location in which the minimize window action was originally initiated. Regardless of the window action, the software tool 20 is configured to recognize (and/or be triggered by) the window action, such that the software tool 20 relocates the mouse pointer icon 210 to the post selection location as predefined/preset by the user.

Continuing in FIG. 3, the user can set the post selection location to be at a particular location on the tool bar 230. For example, mouse pointer icon 210b is shown as being relocated to the start button (or any area on the tool bar 230 including the clock and one of the minimized windows/applications 220) of the graphical user environment 200 by the software tool 20. The user can set the software tool 20 to relocate the mouse pointer icon 210 to another open window 225 in the graphical user environment 200. For example, the software tool 20 can be configured to relocate the mouse pointer icon 210c to a button in the tool bar 235 of the window 225, such as the file button or a play button in a media player window. Also, the software tool 20 can be configured to relocate the mouse pointer icon 210d to the center/middle of the open window 225. Although not shown so as not to obscure FIG. 3, there may be multiple windows open like window 225 after the window action occurs to window 205. In response to the window action (selection/execution) on window 205, the software tool 20 can be configured to automatically relocate the mouse pointer icon 210 to the left most open window, the right most open window, bottom most open window, and/or the top most open window within the graphical user environment 200 based on the left margin, right margin, top margin, and bottom margin in the graphical user environment 200. For example, the software tool 20 is configured with logic to scan (in the graphical user environment 200) from the left margin to determine and reach the left most open window, to scan from the right margin to determine and reach the right most open window, to scan from the top margin to determine and reach the top most open window, and to scan from the bottom margin to determine and reach the bottom most open window.

For another post selection location, the software tool 20 is configured to determine that the window 225 is the most active window of all multiple open windows (not shown) after the window action, and the software tool 20 is configured to relocate the mouse pointer icon 210 to the center or tool bar of the most active window 225. In this case, the software tool 20 is configured to (temporarily) maintain statics (in memory 15) of operations and activities (interactively) performed by the user (which may include processes respectively run/initiated in the multiple windows using, e.g., the mouse pointer icon 210). Based on the window with the most activity (e.g., most selections, interactivity, and/or processes running) being identified, the software tool 20 determines this window, e.g., window 225, to be the most active, and relocates the mouse pointer icon 210 to this most active window 225.

In another case, the user of the computing device 10 may set a desired grid location in the graphical user (desktop) environment 200 via the software tool 20 as the post selection location for the mouse pointer icon 210. For instance, based on the desired grid location, the software tool 20 is configured to relocate the mouse pointer icon 210e to specific x and y coordinates in the graphical user environment 200. The mouse pointer icon 210e is shown at a post selection location that is at the center/middle of the graphical user environment 200. In addition to the center of the graphical user environment 200, the software tool 20 can relocate the mouse pointer icon 210 to any desired grid location (set by the user, e.g., by double clicking) in the graphical user environment 200 as the post selection location which can include upper locations, bottom locations, left locations, right locations, the center location, and any location in between.

Continuing in FIG. 3, the software tool 20 can be set to relocate the mouse pointer icon 210 to a specific application/window, such as a music/media player, an Internet browser, a video/music sharing application, a word processing application, a social networking application, an email/text application, a gaming application, electronic book reading application, etc. After the window action, the mouse pointer icon 210f is shown as being relocated (by the software tool 20) to a specific Internet web browser application, such as Internet Explorer®. The user may have many icons or widgets on his graphical user (desktop) environment 200, and the software tool 20 is configured to be set to relocate the mouse pointer icon 210 to any designated widget as the post selection location, after a window action.

As can be recognized by one skilled in the art, the software tool 20 is configured to relocate the mouser pointer icon 210 to any post selection location as set by the user, such that the mouse pointer icon 210 is not required to remain at the selection location 215 after a window action. For setting the post selection location after a window action, there are many options which can be displayed to a user within a menu of the software tool 20 as post selection location options for the software tool 20 to relocate the mouse pointer icon 210. FIG. 4A illustrates a screen 400 of the software tool 20 in which the user can set the post selection location to relocate the mouse pointer icon 210 after a window action (e.g., after a window close, window minimize, and/or window maximize) according to an exemplary embodiment. The screen 400 is part of the software tool 20 user options which allow the user to configure the default post selection location as desired, and the screen 400 is a window (just like windows 205 and 225) displayed in the graphical user environment. The user may open the software tool 20 (by going to the start button and/or by clicking on a software tool 20 icon displayed in the graphical user environment 200), and the software tool 20 displays the screen 400. The user may select the file button and then select/check the set post selection location item/button shown in FIG. 4A. The set post selection location item/button allows the user to designate a post selection location for relocating the mouse pointer icon 210 after a window action. In response to selecting the set post selection location button, the software tool 20 may ask (confirm) the user if the user wants to set the default post selection location. In response to selection of the yes button, the software tool 20 is configured to present the user with a customize post selection location menu 405 of selection items/buttons displayed in the screen 400 of FIG. 4B according to an exemplary embodiment.

The customize post selection location menu 405 of selection items/buttons displayed to the user on the display screen 45 may include but are not limited to a relative to windows open on the GUI button 450; relative to application tool bar button 452; specific application button 454; absolute location on the GUI button 456; most active window button 458; last window used button 460; and/or default location, in shadow of previous window button 462.

When the user selects the relative to windows open on the GUI button 450 displayed by the software tool 20, the software tool 20 causes the mouse pointer icon 210 to relocate to a post selection location of another open window, such as the open window 225 when a window action is performed (e.g., to close, maximize, minimize, resize, etc.) the window 205. For example, the software tool 20 is configured to allow the user to set the relocation window in which to relocate and display the mouse pointer icon 210 after a window action as the left most open window, right most open window, center most open window, bottom most open window and top most open window of the open windows (e.g., in a case where multiple windows are open in the graphical user environment 200. If the user selects the relative to application tool bar button 452, the software tool 20 is configured to relocate the mouse pointer icon 210 to a location, e.g., on the tool bar 235 of the window 225. For example, the software tool 20 is configured to relocate and display the mouse pointer icon 210 at the file button or other menu heading in the next open (or open but minimized) file of the same operating system type or application type as the previously closed window (e.g., same operating system type or application type as now closed window 205).

If the user selects the specific application button 454, the software tool 20 is configured to relocate the mouse pointer icon 210 to a specific application/program. For example, the software tool 20 may relocate the mouse pointer icon 210 for display at a specific application icon (e.g., Lotus Notes® application, web browser, media player, etc.) and/or a specification application already opened (i.e., currently running) If the user selects the absolute location on the GUI button 456, the software tool 20 is configured to relocate and display the mouse pointer icon 210 at an absolute x and y coordinate on the current graphical user interface (desktop), e.g., such as at the center of the graphical user environment 200, at the graphical user interface (desktop) tool bar (e.g., the start menu in Windows® operating system or other operating system), etc.

Additionally, if the user selects the most active window button 458, the software tool 20 is configured to collect statistics on which window is most active and relocate and display the mouse pointer icon 210 in the most active window. When the user selects the last window used button 460, the software tool 20 is configured to relocate and display the mouse pointer icon 210 at the window that was in use prior to closing current window (e.g., at the window 225 which was in use prior to closing the window 205). If the user selects the default location, in shadow of previous window button 462, the software tool 20 is configured to leave the mouse pointer icon 210 at the normal default location, which is the selection location 215. If any post selection location is not applicable at the time of a window action, the software tool 20 is configured to leave the mouse pointer icon 210 at the normal default location, which is the selection location 215.

Note that the list of selections items/buttons in the customize post selection location menu 405 is not meant to be exhaustive, and it is contemplated that additional post selection locations can be added to the customize post selection location menu 405.

Figure 4E:
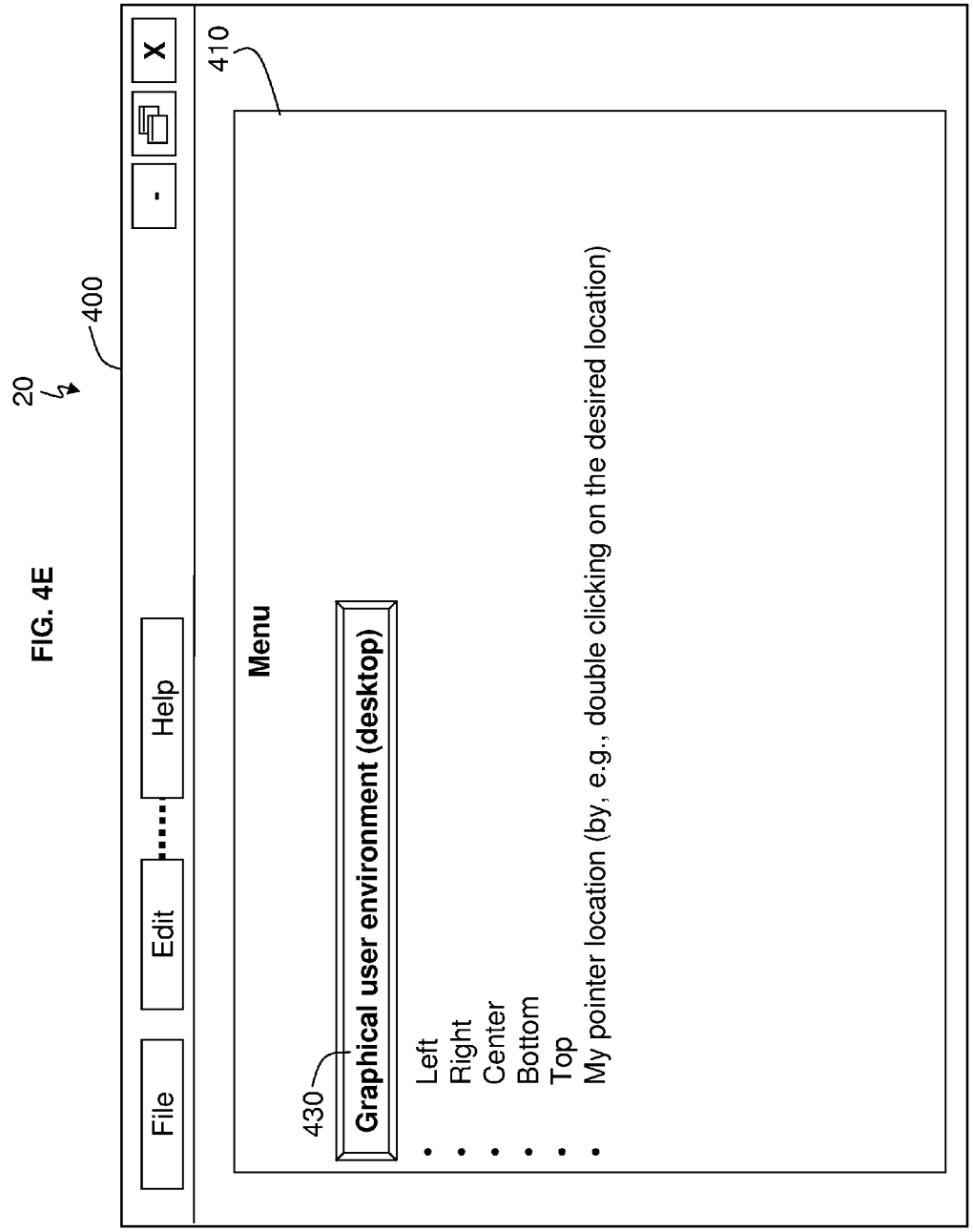
FIG. 4E illustrates a screen continuing the menu of advance options according to an exemplary embodiment.

In FIG. 4B, the user may click on the desired selection (e.g., click the item or scroll to and select the desired item via the user interface 50) in the customize post selection location menu 405, and the software tool 20 is configured and set to relocate the mouse pointer icon 210 to the selected post selection location after a window action. Additionally, the user may select set advance options button of the software tool 20 shown as a dashed box in FIG. 4A. In one implementation, after selecting set the advance options button of the file button, the software tool 20 may ask (confirm) the user if the user wants to set advance options for the default post selection location, and the user can select yes. Selection of the advance options button by the user causes the software tool 20 to display an advance options menu 410 on the display screen 45 for further specifying the post selection location as shown in FIGS. 4C, 4D, and 4E. The advance options button allows the user to designate exactly where in the relocation window (center, top, bottom, left, right, (which button of the) tool bar, etc., of the relocation window), exactly which location on the tool bar of the graphical user environment (such as the start button, at the clock, etc.), exactly which specification application to relocate to, and/or exactly where in the graphical user environment (desktop) to relocate the mouse pointer icon 210.

When the user has selected to relocate to a particular relocation window by selecting the relative window open on the GUI button 450, the user can further identify exactly where in that relocation window (such as the window 225) that the software tool 20 is to relocate and display the mouse pointer icon 210. The relocation window can be any window (including any specific application like, e.g., Lotus Notes® application, web browser application, media player application, etc., including a specific application selected by the user through a browse selection item). Also, the relocation window may include the most active window.

Regardless of what relocation window the software tool 20 is set to relocate the mouse pointer icon 210 to, the advance options menu 410 of the software tool 20 is configured for the user to click on and/or highlight and select the left, right, center, bottom, top, and my pointer location buttons under the relocation window tab 415. Selecting the left button, right button, center button, bottom button, and/or top button cause the software tool 20 to relocate and display the mouse pointer icon 210 to the respective location within the relocation window 225. For example, selecting, e.g., the left button in the relocation window tab 415 will cause the software tool 20 to display the mouse pointer icon 210 to the left in the relocation window 225. Besides the my pointer location button under the relocation window tab 415, selection of the other buttons under the relocation window tab 415 causes the software tool 20 to relocate the mouse pointer icon 210 to their respective locations within the relocation window, after a window action. However, selection of the my pointer location button may operate by requiring the user to go to any open window (and/or open a window if one is not previously opened) in the graphical user environment 200, and to double click (or make a selection by clicking the right mouse button to open a right click menu that includes the my pointer location selection for relocation window) at the exact point in the open window that the user wants the software tool 20 to designate as the place within the relocation window to relocate and display the mouse pointer icon 210 after the window action. For example, after selecting the my pointer location button under the relocation window tab 415 (and/or the tabs 420 and 430), the user can double click anywhere on any open window in the graphical user environment 200; the software tool 20 is configured to remember (store in memory 15) this relative location (which could be in the left, right, center, bottom, top of the relocation window and/or could be a file, edit, play, etc. button in the tool bar of the open window), such that the software tool 20 will relocate and display the mouse pointer icon 210 at this designated relative location within the relocation window, after the window action.

If the user selected the relative to application tool bar button 452 to relocate to the tool bar/menu heading of a relocation window/application in FIG. 4B, the software tool 20 is configured to relocate the display of the mouse pointer icon 210 to a general (default setting) location of the tool bar/menu heading, such as to the start button, file button, etc. Additionally, after selecting the advance options button of the software tool 20 in FIG. 4A, the user can further specify exactly where in the tool bar/menu heading that the mouse pointer icon 210 should be displayed by selecting a tool bar/menu heading of relocation window tab 420 shown in FIG. 4C. The tool bar/menu heading of relocation window tab 420 of the software tool 20 is configured to allow the user to identify exactly where in the tool bar/menu heading of the relocation window (which may be a specific application such as a media player window) that the user wants the software tool 20 to display the relocated mouse pointer icon 210. Examples buttons are illustrated under the tool bar/menu heading of relocation window tab 420, and the user may import additional buttons under the tool bar/menu heading of relocation window tab 420. The example buttons include but are not limited to the file, edit, play, send, new, pause, and my pointer location (by, e.g., double clicking on the desired location in the tool bar/menu heading of an open window) buttons.

Other than the my pointer location button under the tool bar/menu heading of relocation window tab 420, selection of the other example buttons cause the software tool 20 to relocate the mouse pointer icon 210 to their respective locations (e.g., relocate the mouse pointer icon 210 to the play button as the post selection location in tool bar 235 of relocation window 225) in the tool bar/menu heading of the relocation window, after a window action. However, selection of the my pointer location button operates by requiring the user to go to any open window (and/or open a window if one is not previously opened) in the graphical user environment 200, and to double click (or make a selection by clicking the right mouse button to open a right click menu that will display a my pointer location selection for relocation window; this my pointer location selection can be highlighted/executed) at the exact point on the tool bar/menu heading (e.g., tool bar 235) in the open window that the user wants the software tool 20 to designate. This designation of the my pointer location selection is the place (i.e., the post selection location) within the relocation window to relocate and display the mouse pointer icon 210 after any window action.

When the user has selected the specific application button 454 of the software tool 20, the user can identify/select a specific application/program for the mouse pointer icon 210 to relocate to (and/or open up) after a window action. For example, FIG. 4D illustrates a specific application/program tab 425 displayed to the user in the advance options menu 410, and the specification application tab 425 allows the user to select a specific application/program for the software tool 20 to relocate the mouse pointer icon 210 for display. Examples of specification applications/programs buttons under the specific application table 425 may include but are not limited to Lotus Notes® application, Mozilla® Firefox® browser, Microsoft® Word application, Instant Messenger® application, media player, and so forth. Additional buttons under the specific application tab 425 may be imported for selection by the user of the software tool 20.

When the user has selected the absolute location on the GUI button 456 (e.g., such as in the graphical user environment 200), the user may select the advance options button to further specify exactly where in the graphical user environment 200 to relocate and display the mouse pointer icon 210. For example, FIG. 4E continues the display of the advance options menu 410 when the advance options button is selected, and illustrates a graphical user environment (desktop) tab 430. The graphical user environment (desktop) tab 430 includes left, right, center, bottom, top, and my pointer location (by, e.g., double clicking on the desired location) buttons that indicate to the software tool 20 where to display the mouse pointer icon 210 in the graphical user environment 200 after a window action has been performed. Selection of the left, right, center, bottom, and top buttons cause the software tool 20 to display the mouse pointer icon 210 in these respective locations in the graphical user environment 200. For example, selection of the left button will cause the software tool 20 to relocate the mouse pointer icon 210 to the (general) left side of the graphical user (desktop) environment 200, after a window action is performed. However, when the my pointer location button is selected under the graphical user environment tab 430, the software tool 20 is configured to allow the user to traverse to any area/point (e.g., any x and y coordinate, including points on the tool bar 230) in the graphical user environment 200 and then double click at that area/point to designate it. This will set that area/point in graphical user environment 200 as the post selection location to display the mouse pointer icon 210 after the window action.

Note that directional, locational, and spatial terms have been utilized herein such as left, right, top, center, middle, bottom, and so forth to describe and explain a post selection location for relocating and displaying the mouse pointer icon 210 after a window action is performed. These terms can be further refined as desired and/or include additional specificity such as upper left, lower left, middle left, bottom left, bottom middle, bottom right, and so forth.

Also, various examples have been provided with respect to a window action such as closing, minimizing, and/or maximizing a window. Exemplary embodiments are not meant to be limited to such window actions but can include opening a window, resizing a window, and/or moving a window (e.g., dragging a window). The options for selecting and setting a post selection location for these window actions can be performed by the software tool 20 as discussed. Instead of the relocation window being a different window upon which the window action was taken, in this case the software tool 20 is configured to relocate the mouse pointer icon 210 to a particular post selection location within/on the window upon which the window action occurred. For example, the user may open a media player window from one of the minimized applications 220 or from a program file under the start button, and the software tool 20 is configured to relocate the mouse pointer icon 210 to the post selection location designated by the user for a window open action. Instead of remaining at the selection location (which may be the start menu or the tool bar 230 showing the minimized applications 220), the software tool 20 is configured to relocate and display the mouse pointer icon 210 at a play button or a choose media button (e.g., select tracks, select media, select videos, etc.) of the now opened media player window, after the window action to open the media player window has been performed. The software tool 20 is configured to relocate and display the mouse pointer icon 210 in any of the post selection locations as discussed herein with respect to an area/location in a relocation window. The software tool 20 is configured to allow the user to limit the applications/windows on which the post selection location operates (when the window action is an open window) to a selected number of windows/application (maybe 1, 2, 3 ... 5 and/or 10 specification applications), and each particular application/window can have its own post selection location designated by the user via the software tool 20. In addition to the example of relocating to the play button (or any other button) when the media player window is opened, the software tool 20 may be configured to relocate and display the mouse pointer icon 210 at an open file button icon or file button when a word processing window/application (such as Microsoft® Word) is opened. In one case, the user may open a gaming window/application, and the user can set the post selection location (via the software tool 20) for this gaming application to relocate and display the mouse pointer icon 210 at a start game button, when the window action is set to open window. It is understood that various options of the software tool 20 (including my designation in a particular open window/application) still logically apply to any post selection location that is on or within a relocation window.

Furthermore, by utilizing the software tool 20, the user can set one post selection location for relocating and displaying the mouse pointer icon 210 in response to window actions like closing, minimizing, and maximizing a window/application, and the user can set another post selection location for relocating and displaying the mouse pointer icon 210 in response to window actions like opening, resizing, and moving a window/application. The user may have multiple post selection locations set which apply to different types of window actions and/or different specification applications (such as one post selection location set for a word processing application, another for a gaming application, and another set for a media player application).

FIG. 5 illustrates a method 500 for defining a post selection location of a mouse pointer icon 210 in a display screen (such as the graphical user environment 200 of the display screen 45) of the computing device 10.

The software tool 20 is configured to receive input of the post selection location for the mouse pointer icon 210 at block 505. The post selection location defines a default location/position to relocate/move the mouse pointer icon 210 in response to a window action taken on a window displayed in the display screen. The post selection location also can define a default location/position to relocate the mouse pointer icon 210 in a newly opened (or resized) window/application when a window action is taken to open (or resize) a new window.

In response to the window action in which the mouse pointer icon is initially displayed at a selection location (such as the selection location 215 than can be to minimize, maximize, and/or close a window, and also a selection location to open a new window/application) corresponding to the execution of the window action, the software tool 20 is configured to relocate/move the mouse pointer icon 210 to the post selection location such that the mouse pointer icon 210 is displayed at the post selection location (not the execution/selection location 215) in the display screen 45 at block 510.

The post selection location for the mouse pointer icon 210 is defined in advance by the user via the software tool 20, such that the mouse pointer icon 210 moves to the post selection location and is automatically displayed in the display screen 45 at the post selection location. The window action comprises at least one of maximizing the window, minimizing the window, and closing the window. When an operating system (such as the operating system 70) moves the mouse pointer icon 210 along with dragging (moving) the window (e.g., the window 225) such that the mouse pointer icon remains at a location corresponding to where the window is moved to, the software tool 20 is configured to cause the mouse pointer icon 210 to jump to the post selection location (which may be the center of the window 225 or to a file button of the window 225 after the window 225 has been moved).

Figure 6:
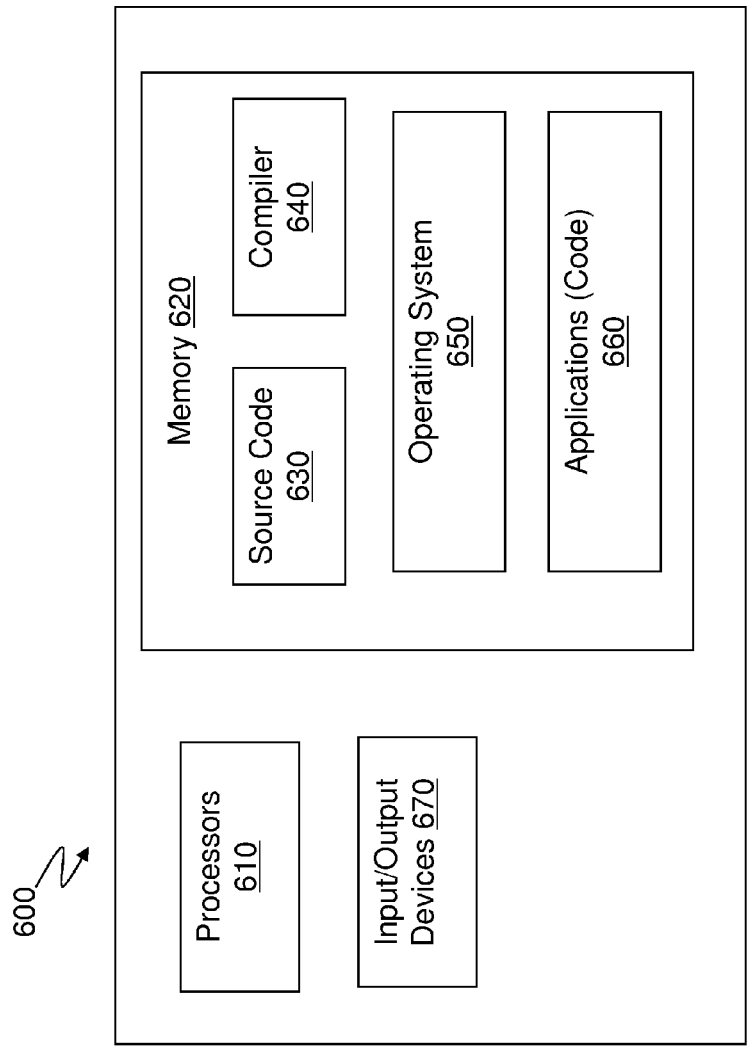
FIG. 6 illustrates an example of a computer having capabilities, which may be included in exemplary embodiments.

FIG. 6 illustrates an example of a computer 600 having capabilities, which can be included in exemplary embodiments. Various methods, procedures, modules, flow diagrams, tools, application, and techniques discussed herein may also incorporate and/or utilize the capabilities of the computer 600. Moreover, capabilities of the computer 600 may be utilized to implement features of exemplary embodiments discussed herein. One or more of the capabilities of the computer 600 may implement any element discussed herein such as but not limited to the computing device 10.

Generally, in terms of hardware architecture, the computer 600 may include one or more processors 610, computer readable storage memory 620, and one or more input and/or output (I/O) devices 670 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 610 is a hardware device for executing software that can be stored in the memory 620. The processor 610 can be virtually any custom made or commercially available processor, a central processing unit (CPU), a data signal processor (DSP), or an auxiliary processor among several processors associated with the computer 600, and the processor 610 may be a semiconductor based microprocessor (in the form of a microchip) or a macroprocessor.

The computer readable memory 620 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 620 may incorporate electronic, magnetic, optical, and/or other types of storage media. Note that the memory 620 can have a distributed architecture, where various components are situated remote from one another, but can be accessed by the processor 610.

The software in the computer readable memory 620 may include one or more separate programs, each of which comprises an ordered listing of executable instructions for implementing logical functions. The software in the memory 620 includes a suitable operating system (O/S) 650, compiler 640, source code 630, and one or more applications 660 of the exemplary embodiments. As illustrated, the application 660 comprises numerous functional components for implementing the features, processes, methods, functions, and operations of the exemplary embodiments. The application 660 of the computer 600 may represent numerous applications, agents, software components, modules, interfaces, controllers, etc., as discussed herein but the application 660 is not meant to be a limitation.

The operating system 650 may control the execution of other computer programs, and provides scheduling, input-output control, file and data management, memory management, and communication control and related services.

The application(s) 660 may employ a service-oriented architecture, which may be a collection of services that communicate with each. Also, the service-oriented architecture allows two or more services to coordinate and/or perform activities (e.g., on behalf of one another). Each interaction between services can be self-contained and loosely coupled, so that each interaction is independent of any other interaction.

Further, the application 660 may be a source program, executable program (object code), script, or any other entity comprising a set of instructions to be performed. When a source program, then the program is usually translated via a compiler (such as the compiler 640), assembler, interpreter, or the like, which may or may not be included within the memory 620, so as to operate properly in connection with the O/S 650. Furthermore, the application 660 can be written as (a) an object oriented programming language, which has classes of data and methods, or (b) a procedure programming language, which has routines, subroutines, and/or functions.

The I/O devices 670 may include input devices (or peripherals) such as, for example but not limited to, a mouse, keyboard, scanner, microphone, camera, etc. Furthermore, the I/O devices 670 may also include output devices (or peripherals), for example but not limited to, a printer, display, etc. Finally, the I/O devices 670 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 670 also include components for communicating over various networks, such as the Internet or an intranet. The I/O devices 670 may be connected to and/or communicate with the processor 610 utilizing Bluetooth connections and cables (via, e.g., Universal Serial Bus (USB) ports, serial ports, parallel ports, FireWire, HDMI (High-Definition Multimedia Interface), etc.).

When the computer 600 is in operation, the processor 610 is configured to execute software stored within the memory 620, to communicate data to and from the memory 620, and to generally control operations of the computer 600 pursuant to the software. The application 660 and the O/S 650 are read, in whole or in part, by the processor 610, perhaps buffered within the processor 610, and then executed.

When the application 660 is implemented in software it should be noted that the application 660 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 660 can be embodied in any computer-readable medium 620 for use by or in connection with an instruction execution system, apparatus, server, or device, such as a computer-based system, processor-containing system, or other system that can fetch the instructions from the instruction execution system, apparatus, or device and execute the instructions. In the context of this document, a "computer-readable storage medium" can be any means that can store, read, write, communicate, or transport the program for use by or in connection with the instruction execution system, apparatus, or device. The computer readable medium can be, for example but not limited to, an electronic, magnetic, optical, or semiconductor system, apparatus, or device.

More specific examples (a nonexhaustive list) of the computer-readable medium 620 would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 660 is implemented in hardware, the application 660 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It is understood that the computer 600 includes non-limiting examples of software and hardware components that may be included in various devices, servers, and systems discussed herein, and it is understood that additional software and hardware components may be included in the various devices and systems discussed in exemplary embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for a post selection location of a mouse pointer icon in a display screen of a computing device, the method comprising:
   receiving, by a software tool executed by the computing device, input of the post selection location for the mouse pointer icon, the post selection location defining a default location to move the mouse pointer icon in response to a window action taken on a window displayed in the display screen; and
   in response to the window action in which the mouse pointer icon is initially displayed at a selection location corresponding to the window action, moving the mouse pointer icon to the post selection location such that the mouse pointer icon is displayed at the post selection location in the display screen;

wherein the post selection location is set by a user of the software tool via a user interface, the user interface includes options of being designated at another open window, at a tool bar of the another open window, at a center of the another open window, at a minimized windows bar in the display screen, at a center of the display screen, at a most active window, and at a last window used; wherein the window action would cause the mouse pointer icon to remain and be displayed at the selection location when no post selection location is set by the user in the software tool; and in response to the post selection location being set by the user in the software tool, the software tool is configured to recognize that the post selection location is set and relocate the mouse pointer icon to the post selection location for display in place of the selection location.

2. The method of claim 1, wherein the post selection location for the mouse pointer icon is defined in advance by a user, such that the mouse pointer icon moves to the post selection location and is automatically displayed in the display screen at the post selection location.

3. The method of claim 1, wherein the window action comprises at least one of maximizing the window and minimizing the window.

4. The method of claim 1, wherein when an operating system moves the mouse pointer icon along with dragging the window such that the mouse pointer icon remains at a location corresponding to where the window is moved, the software tool is configured to cause the mouse pointer icon to relocate to the post selection location.

5. The method of claim 1, further comprising displaying a plurality of options for selecting the post selection location.

6. The method of claim 5, wherein the plurality of options for selecting the post selection location are configured to allow a user to designate exactly where the mouse pointer icon is to be displayed in response to the window action.

7. A computing device configured to define a post selection location of a mouse pointer icon in a display screen, comprising:
   a processor;
   a software tool configured to operate on the processor, the software tool being configured to:
   receive input of the post selection location for the mouse pointer icon, the post selection location defining a default location to move the mouse pointer icon in response to a window action taken on a window displayed in the display screen; and
   in response to the window action in which the mouse pointer icon is initially displayed at a selection location corresponding to the window action, move the mouse pointer icon to the post selection location such that the mouse pointer icon is displayed at the post selection location in the display screen;
   wherein the post selection location is set by a user of the software tool via a user interface, the user interface includes options of being designated at another open window, at a tool bar of the another open window, at a center of the another open window, at a minimized windows bar in the display screen, at a center of the display screen, at a most active window, and at a last window used; wherein the window action would cause the mouse pointer icon to remain and be displayed at the selection location when no post selection location is set by the user in the software tool; and
   in response to the post selection location being set by the user in the software tool, the software tool is configured to recognize that the post selection location is set and relocate the mouse pointer icon to the post selection location for display in place of the selection location.

8. The device of claim 7, wherein the post selection location for the mouse pointer icon is defined in advance by a user via the software tool, such that the software tool moves the mouse pointer icon to the post selection location and automatically displays the mouse pointer icon in the display screen at the post selection location.

9. The device of claim 8, further comprising an operating system;
   wherein when the operating system moves the mouse pointer icon along with dragging the window such that the mouse pointer icon remains at a location corresponding to where the window is moved, the software tool is configured to cause the mouse pointer icon to relocate to the post selection location.

10. The device of claim 7, wherein the window action comprises at least one of maximizing the window, minimizing the window, and closing the window.

11. The device of claim 7, wherein the software tool is configured to display to a user a plurality of options for selecting the post selection location.

12. The device of claim 11, wherein the plurality of options for selecting the post selection location are configured to allow the user to designate exactly where the mouse pointer icon is to be displayed in response to the window action.

13. A computer program product for defining a post selection location of a mouse pointer icon in a display screen of a computing device, the computer program product comprising:
   a non-transitory computer readable storage medium having computer readable program code embodied therewith, the computer readable program code being configured for:
   receiving the post selection location for the mouse pointer icon, the post selection location defining a default location to move the mouse pointer icon in response to a window action taken on a window displayed in the display screen; and
   in response to the window action in which the mouse pointer icon is initially displayed at a selection location corresponding to the window action, moving the mouse pointer icon to the post selection location such that the mouse pointer icon is displayed at the post selection location in the display screen;
   wherein the post selection location is set by a user of the software tool via a user interface, the user interface includes options of being designated at another open window, at a tool bar of the another open window, at a center of the another open window, at a minimized windows bar in the display screen, at a center of the display screen, at a most active window, and at a last window used; wherein the window action would cause the mouse pointer icon to remain and be displayed at the selection location when no post selection location is set by the user in the software tool; and
   in response to the post selection location being set by the user in the software tool, the software tool is configured to recognize that the post selection location is set and relocate the mouse pointer icon to the post selection location for display in place of the selection location.

14. The computer program product of claim 13, wherein the post selection location for the mouse pointer icon is defined in advance by a user, such that the mouse pointer icon moves to the post selection location and is automatically displayed in the display screen at the post selection location.

15. The computer program product of claim 13, wherein the window action comprises at least one of maximizing the window, minimizing the window, and closing the window.

16. The computer program product of claim 13, wherein when an operating system moves the mouse pointer icon along with dragging the window such that the mouse pointer icon remains at a location corresponding to where the window is moved, the computer readable program code is configured to cause the mouse pointer icon to relocate to the post selection location.

17. The computer program product of claim 13, wherein the computer readable program code is configured to display a plurality of options for selecting the post selection location.

18. The computer program product of claim 17, wherein the plurality of options for selecting the post selection location are configured to allow a user to designate exactly where the mouse pointer icon is to be displayed in response to the window action.

* * * * *